United States Patent [19]
Breton

[11] Patent Number: 6,148,656
[45] Date of Patent: Nov. 21, 2000

[54] REAL-TIME ON-ROAD VEHICLE EXHAUST GAS MODULAR FLOWMETER AND EMISSIONS REPORTING SYSTEM

[75] Inventor: Leo Alphonse Gerard Breton, Bethesda, Md.

[73] Assignee: The United States of America as represented by the Adminstrator of the Environmental Protection Agency., Washington, D.C.

[21] Appl. No.: 09/226,920

[22] Filed: Jan. 5, 1999

Related U.S. Application Data

[60] Provisional application No. 60/070,483, Jan. 5, 1998.

[51] Int. Cl.⁷ .............................. G01M 15/00; G01N 1/22
[52] U.S. Cl. ........................................... 73/23.31; 73/118.1
[58] Field of Search ............................ 73/23.31, 23.32, 73/116, 117.2, 117.3, 118.1

[56] References Cited

U.S. PATENT DOCUMENTS

| | | |
|---|---|---|
| 2,782,103 | 2/1957 | Prentiss . |
| 3,284,165 | 11/1966 | Baumann et al. . |
| 3,999,425 | 12/1976 | Collin . |
| 4,727,746 | 3/1988 | Mikasa et al. . |
| 5,099,680 | 3/1992 | Fournier et al. . |
| 5,105,651 | 4/1992 | Gutmann . |
| 5,218,857 | 6/1993 | Decker et al. . |
| 5,410,907 | 5/1995 | Ström et al. . |
| 5,550,737 | 8/1996 | Tedeschi . |
| 5,639,957 | 6/1997 | Zarchy . |
| 5,709,082 | 1/1998 | Harris et al. . |
| 5,711,021 | 1/1998 | Book . |
| 5,731,510 | 3/1998 | Jones et al. . |
| 5,756,360 | 5/1998 | Harvey et al. .......................... 73/23.31 |

*Primary Examiner*—Eric S. McCall
*Attorney, Agent, or Firm*—Lorusso & Loud

[57] ABSTRACT

An on-board vehicle emissions testing system includes an instrument module adapted to be detachably connected to the exhaust pipe of a vehicle to provide for flow of exhaust gas therethrough. The instrument module includes a differential pressure probe which allows for determination of flow rate of the exhaust gas and a gas sampling tube for continuously feeding a sample of the exhaust gas to a gas analyzer. In addition to the module, the on-board emission testing system also includes an elastomeric boot for detachably connecting the module to the exhaust pipe of the vehicle, a gas analyzer for receiving and analyzing gases sampled within the module and a computer for calculating pollutant mass flow rates based on concentrations detected by the gas analyzer and the detected flow rate of the exhaust gas. The system may also include a particulate matter detector with a second gas sampling tube feeding same mounted within the instrument module.

19 Claims, 9 Drawing Sheets

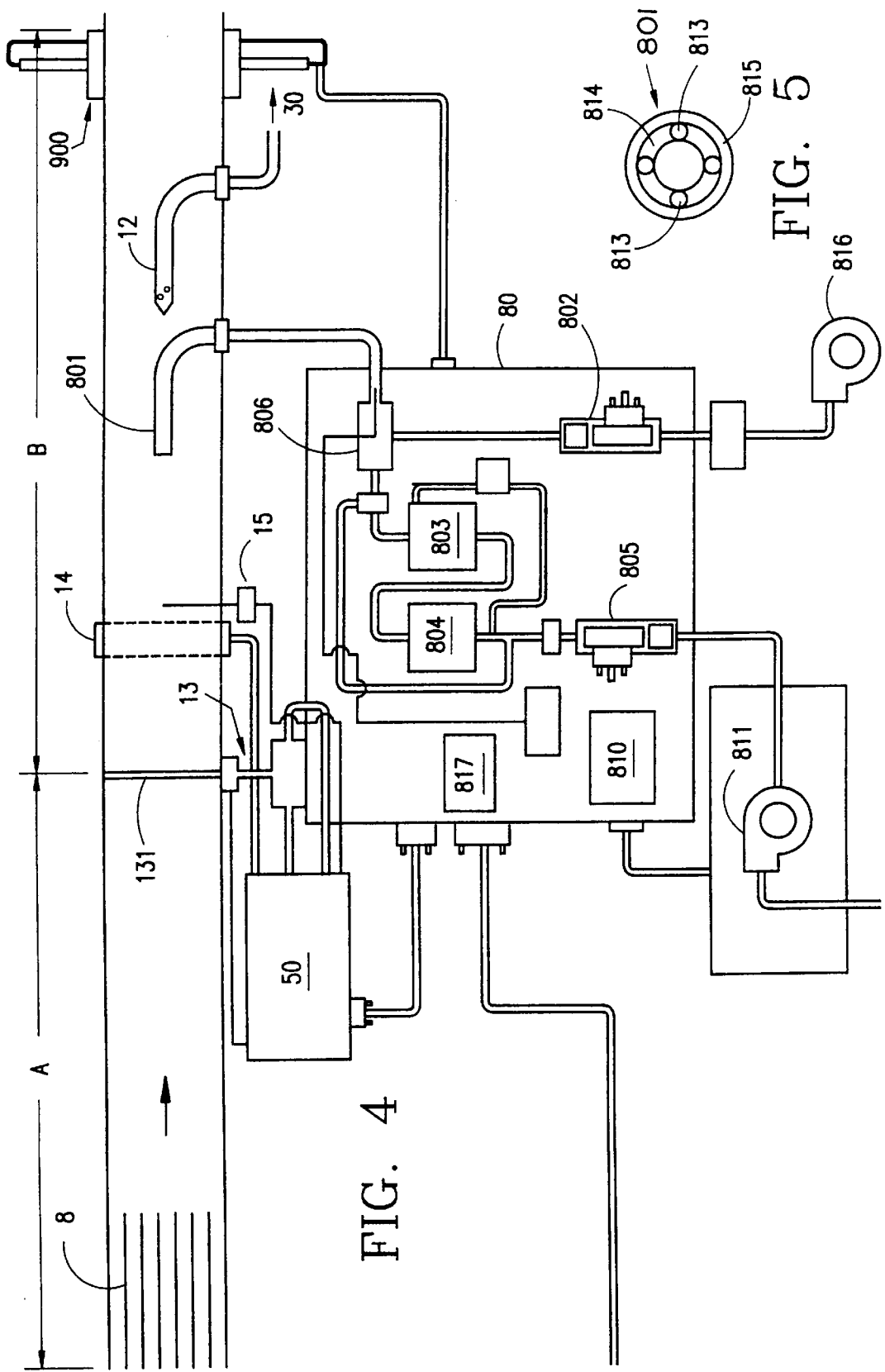

FIG. 10

General Purpose Automotive Analyzer 6.5

| Date | Time | Secs |
|---|---|---|
| 03/11/96 | 03:44:07 PM | 1422 |

Save Data To
C:\ANALYZER\Mar11_03.19P

Analyzer ⊠

| | |
|---|---|
| HC | 7 |
| CO | 0.01 |
| CO2 | 13.65 |
| O2 | 0.44 |
| NOx | 63 |
| RPM | 0 |
| TMP | 86.9 |
| A/F | 15.12 |

⊠ Vmix(scfm)

0  100  200  300 grams/mile/std   △⊠ 7.4 NOx
⊠ HC  ⊠ CO  ⊠ CO2  ⊠ O2

| 0.67 | 14.57 | 1122.0 | 21.48 | 2.63 |

MPG △⊠
40 30 20 10 0

OTC Scan Tool  ▣ Pathfinder 95

Text to Numbers  Setup Keystrokes  ○ Remote ○

| Field Names | Data |
|---|---|
| A/C REQUES | NO |
| AIR/FUEL R | 14.7 |
| COOLANT TE | 204F |
| INJ PULSE | 01.2MS |
| LOOP STATU | CLOS |
| MAP | 101HG |
| O2 FUEL ST | LEAN |
| ENGINE RPM | 0725 |
| THROTTLE A | 000% |
| VEHICLE SP | 000MPH |

Analog Diff. Inputs

| Chan | X | + | = | Result |
|---|---|---|---|---|
| 1-2 | 2.000 | 10.000 | NTK_A/F | 10.00 |
| 3-4 | 1.471 | -2.087 | Annubar_dP | 0.49 |
| 5-6 | 1000.00 | 0.000 | Exh_Temp | 396.97 |
| 7-8 | 5.669 | 3.576 | Flow_P | 30.32 |

GPS Velocity and Position

HEADING  360

| accel(mph/s) | 0.00 |
| grade(%) | 0.00 |
| climb(ft/s) | 0.00 |
| altitude(ft) | -8.86 |
| latitude(d) | 37.39 |
| longitude(d) | 122.04 |

MPH  0 20 40 60 80 100

Stop  f(hz) 1.00

REAL-TIME ON-ROAD VEHICLE EXHAUST GAS MODULAR FLOWMETER AND EMISSIONS REPORTING SYSTEM

This application claims the benefit of U.S. Provisional No. 60/070,483 filed Jan. 5, 1998.

FIELD OF THE INVENTION

The present invention is a portable exhaust emissions measurement system for vehicles and, more specifically a Real-time On-road Vehicle Emissions reporting system which continuously measures, displays, and records the quantity of gaseous emissions (HC, CO, $CO_2$, NO, and $O_2$), in grams/miles driven as well as fuel economy, engine and vehicle operating parameters, engine air/fuel ratio, and road grade, all at a user-selectable update rate. The present invention also relates to a flowmeter module for utilization in the system.

THE PRIOR ART

The numerical exhaust gas emission standard established by the United States Environmental Protection Agency (EPA) apply to vehicles tested using the Federal Test Procedure (FTP). The FTP is conducted in a laboratory on a dynamometer under controlled environmental conditions where the vehicle is "driven" over a specific speed-time trace while the emissions are sampled. The same speed-time trace is used in testing all passenger cars and light-duty trucks and ideally represents typical in-use driving. During the test, the dynamometer applies steady-state and inertial loading on the vehicle simulating actual road-loading and dynamic loading encountered on the road for the same vehicle speeds. A constant volume sampler (CVS) is used to dilute the exhaust gas with air in such a way that the diluted gas flow rate is held constant as the vehicle's exhaust gas flow rate varies and to obtain a proportionate sample of the diluted exhaust gas during each of the three phases of the test. In this way, the sample's concentration of each pollutant is essentially proportional to the mass emissions of that pollutant.

In the case of vehicles employing heavy-duty engines, such as tractor trailer trucks and city buses, the associated EPA emission standard applies to the vehicle's engines which are emission tested on an engine dynamometer while operated over the EPA "transient test". The emissions sampling system and CVS are similar to that described above for passenger cars. But, the engine to be tested is attached to the engine dynamometer which applies a prescribed torque and engine speed. The engine must be removed from the associated vehicle before testing, if installed. Sometimes vehicle-based electronic sensors which are inputs to the engine's fueling system, such as a vehicle speed sensor, must be left disconnected or must have simulated values during the emissions test. This may lead to emissions measurements which differ from real-world values.

For a manufacturer to obtain a certificate of conformity permitting the sale of a particular family of vehicles or engines, the manufacturer must demonstrate compliance with applicable EPA emission standards. A major part of the demonstration for passenger cars and light-duty vehicles is passing the FTP and/or heavy-duty engines is passing the transient test. Another, and usually opposing, goal for a manufacturer to meet is maximizing vehicle performance or fuel economy. Because the two goals are usually mutually opposed, and since the FTP and transient test are so well defined and repeatable, meeting the certification emissions standards often becomes a process of "tweaking" the calibration values used by the vehicle's electronic fuel injection system until the numerical emissions standards are satisfied with just enough margin to "pass" the FTP and maintain "passing" levels for the "useful life" of the vehicle.

When the calibration for a particular family of vehicles is "tweaked" to pass the FTP, test results do not necessarily reflect the vehicular emissions which result from driving the same vehicle on the road even with the same environmental conditions and vehicle speed schedule. The emissions are dependent not only on the speeds, number of miles and grades driven, but also on the particular driver, familiarity with the course being driven, traffic conditions, etc.

It is important for a responsible vehicle manufacturer to know the actual on-road emissions performance of a vehicle under various competing calibrations and designs so they have the opportunity to make environmental considerations one of the parameters by which they choose a final design or calibration. It is also important for emissions regulators to monitor the emissions performance of vehicles from each of the manufacturers on the road. With today's sophisticated electronic engine controls, road test data is necessary to determine the effectiveness of the FTP and transient test in helping maintain clean air, as well as for estimates of the emissions inventories. It is only by knowing the actual on-road emissions of vehicles that effective policy can be developed regulating those emissions.

To monitor the emissions performance of vehicles on the road, a user-friendly, portable, and easily transferable on-road emissions measurement system is needed. Ideally, installation of such a system would not require modification of the vehicle to be tested. Further, the emissions measurements of any system must agree well with laboratory FTP testing when both systems are operated concurrently.

Vehicular, on-board gas emission monitoring systems are disclosed in U.S. Pat. No. 5,099,680 issued to Fournier et al, U.S. Pat. No. 5,105,651 issued to Gutmann and U.S. Pat. No. 5,709,082 issued to Harris et al. However, none of these prior art on-board systems measures actual exhaust gas flow rate or provides an instrument module which can be easily transferred between vehicles.

U.S. Pat. No. 5,099,680 discloses an on-board system for analysis of a plurality of exhaust gas components (column 3, lines 45–47) and interfaces with the engine computer (column 3, lines 15–18). This prior art system contemplates the calculation of vehicle emissions in grams per mile, apparently based on vehicle speed and engine displacement, as described at column 4, lines 3–20.

U.S. Pat. No. 5,105,651 discloses an on-board system in the embodiment of FIG. 2. Carbon monoxide and hydrocarbon content of the exhaust gas is monitored (column 4, lines 28–30) and exhaust gas analytical data is correlated with vehicle operation as described at column 6, line 42 to column 7, line 23.

U.S. Pat. No. 5,639,957 notes the 30–50% error in calculation of emissions of gaseous pollutants due to the difference between theoretical and actual values for exhaust gas flow. This prior art reference proposes an improved calculation for determination of theoretical exhaust gas flow.

SUMMARY OF THE INVENTION

Accordingly, it is an object of the present invention to provide a mobile, on-board emissions testing system which is transferrable between different vehicles, which provides for a real-time determination of mass flow rates of various gaseous pollutants based on the actual exhaust gas flow rate and which requires no modifications to the vehicle to be tested.

It is another object of the present invention to provide such an emissions testing system in which sensors required to come into contact with the exhaust gas are all incorporated into a module which may be detachably mounted on a vehicle and readily transferred from one vehicle to another.

It is a further object of the present invention to provide such a system with the capability for determination of vehicle operating parameters and correlation of those vehicle operating parameters with pollutant mass flow rates in real time.

It is yet another object of the present invention to provide such a system inclusive of a global position system receiver for continuously monitoring vehicle location and for correlating said pollutant mass flow rates with vehicle driving cycle or driving schedule.

In order to achieve the foregoing objects the present invention provides a mobile vehicle, on-board testing system, including a module designed to be detachably mounted on a vehicle to be tested and support means for detachably fixing the module to a body portion of the vehicle. Connection means, preferably including an elastomeric boot, allows for detachably connecting the module to the exhaust pipe of the vehicle, whereby the flow rate of exhaust gas of the vehicle may be detected by a flow sensing element mounted integrally within the module. Also incorporated into the module is a sampling tube located in close proximity to the flow sensing element for continuously sampling the exhaust gas and routing the sampled exhaust gas to a downstream gas analyzer. The downstream gas analyzer detects concentrations of each of a plurality of gaseous pollutants within the exhaust gas, as sampled through the downstream sample tube, i.e. a sample tube located downstream of an exhaust gas after treatment device, e.g. a catalytic converter. A computer serves as a calculating means for calculating mass flow rates for each of the gaseous pollutants based on the detected concentrations and the detected flow rate of the exhaust gas.

Probes for detecting temperature and absolute pressure of the exhaust gas may also be incorporated into the module. It is advantageous to locate such probes as close as possible to the flow sensing element so that all readings correspond to the same exhaust sample at the same time.

In another aspect, the present invention provides the instrument module utilized in the system described above. The instrument module contains, fixedly mounted therein, an element for determination of flow rate of the exhaust gas (hereinafter "flow sensing element") and the sample tube for continuously sampling the exhaust gas and routing the sampled exhaust gas to a gas analyzer. As noted above, the module may also contain, fixed therein, probes for determination of temperature and absolute pressure of the exhaust gas. The module should include lengths of straight pipe on opposing sides of the probes to provide the necessary upstream and downstream flow paths for accurate sensing. Another optional feature is the provision of flow straightening means, e.g. a plurality of parallel vanes mounted within the module, upstream of the aforementioned instrument probes. For purposes of particulate matter (PM) detection the module would also incorporate a second, open-ended gas sampling tube for feeding a gas sample to a PM analyzer.

The optional particulate matter (PM) detection unit is especially suitable for use with a diesel powered vehicle. The PM detection unit includes at least one filter element for removing particulate matter from an exhaust gas sample, which element may be removed for weighing before and after some predetermined time during which it receives the exhaust gas sample and collects particulate matter therefrom. In an embodiment including the PM detector, a second, open-ended gas sampling tube is fixed within the aforementioned module to provide a sample to the PM detector, independent and separate from the sample provided to the gas analyzer.

Optionally, the system incorporates a second 5-gas analyzer allowing performance of catalytic converter efficiency tests. The gas sample to the primary analyzer is from the vehicle/engine exhaust system downstream of the catalytic converter or other after treatment device. The gas sample to the secondary analyzer is from the vehicle/engine exhaust system upstream of the catalytic converter. By comparing the gas concentrations upstream and downstream of the catalytic converter, the converter efficiency can be determined in real-time. An automotive scan tool may be used to monitor the inputs as sensed by the vehicle's on-board computer. Examples of sensed parameters typically monitored include engine speed (RPM), manifold air pressure (MAP), throttle position (TPS), oxygen sensor voltage, etc. The user selects which of the parameters to monitor. The values of the selected parameters are then displayed on the same screen as the gas emissions data as well as saved to the same data file (see FIG. 10). The parameter values in combination with the gas emissions data help one to determine under what conditions high exhaust gas emissions (i.e. pollutants) are being generated and lead to an understanding of the cause of the high emissions.

Thus, the present invention is a computer-based emissions measurement system designed to be used on a moving vehicle. It measures the real-time mass emissions (grams) of plural gases, e.g. hydrocarbons (HC), carbon monoxide (CO), carbon dioxide ($CO_2$), oxygen ($O_2$), and nitrogen oxide (NO). It does this by using a 5-gas analyzer to measure the concentrations of each of the emissions, a modular exhaust gas flowmeter to measure the exhaust gas volume flow rate corrected to standard conditions (by measurement of exhaust gas temperature and pressure), and by knowing the density of each of the emissions.

Vehicle speed and distance traveled is also measured using a global positioning system (GPS) and/or by monitoring the speed signal sensed by the vehicle's on-board computer. Knowing the distance traveled by the vehicle as well as the real-time mass emissions, the system of the present invention also calculates the emissions in mass per distance traveled (grams per mile) as well as using a carbon balance technique to determine both fuel economy (miles per gallon) and the air/fuel ratio at which the engine is operated. The results of the mass measurements, the gas concentrations, exhaust gas flow rate, air/fuel ratio, fuel economy, etc., are all displayed and updated in real-time on the computer, as well as stored in a data file of the computer.

BRIEF DESCRIPTION OF THE DRAWINGS

FIG. 4 is a schematic view of a modular flowmeter of a second embodiment of the present invention additionally including a particulate matter detection unit (PM detector) and designed for use with a diesel powered vehicle;

FIG. 5 is a cross-sectional view of the probe of the PM detector of FIG. 4;

FIG. 10 is a depiction of a display screen providing a graphical user interface.

DESCRIPTION OF THE PREFERRED EMBODIMENTS

Figure 1:
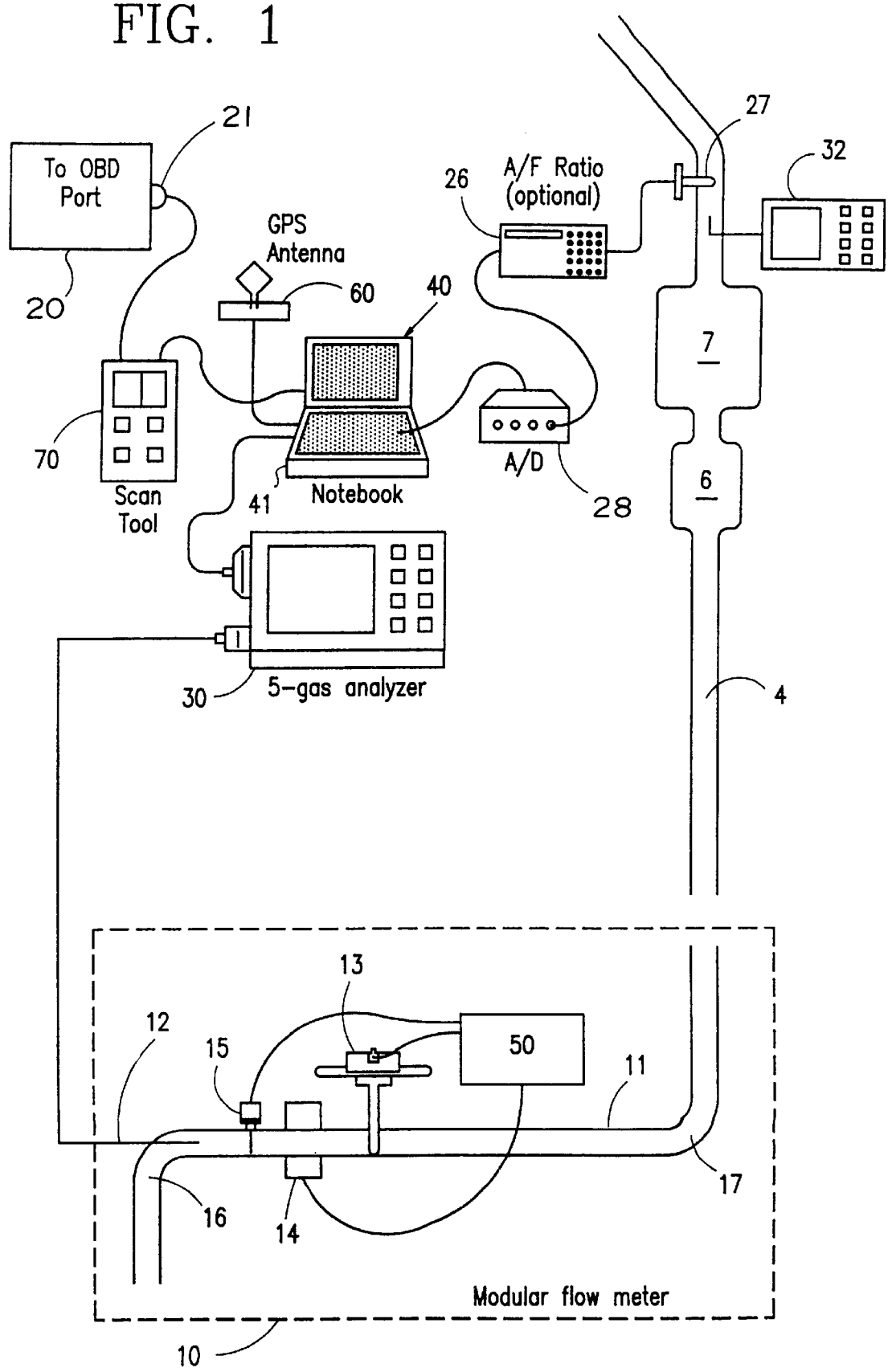
FIG. 1 is a schematic view of the overall emissions reporting system of the present invention.

FIG. 1 shows the overall system as including a flowmeter and gas sampling module 10 adapted for attachment to a tailpipe 4 of a vehicle and a gas analyzer 30 for measuring pollutant concentrations. FIG. 1 also shows the vehicle exhaust system as including the tailpipe 4, a muffler 6 and a catalytic converter 7. Outputs from the flowmeter and gas sampling module 10 and the gas analyzer 30 are received by an emissions computer 40. Emissions computer 40 also receives signals from a keyboard 41 or other user input means. Further, a scan tool 70 connects to the OBD or other port 21 of engine computer 20, has a serial output, interprets the data stream from the engine computer 20, and outputs signals to the emissions computer 40.

Optionally, the system further includes a separate air/fuel ratio meter 26, which uses a lambda sensor 27 in the exhaust gas stream and/or a global positioning receiver 60.

Each of the foregoing components will be described in more detail in the discussion which follows.

Flowmeter Module 10

Figure 2:
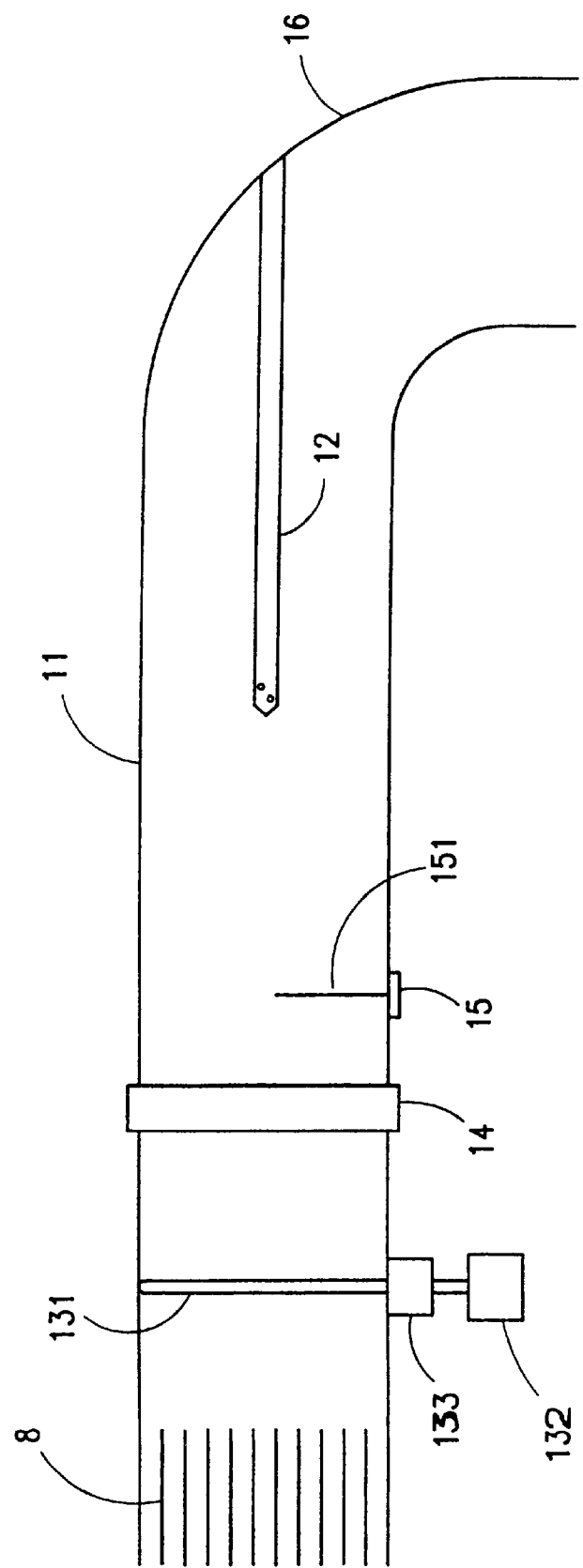
FIG. 2 is a schematic view of the modular flowmeter of the embodiment of FIG. 1.

The design of the modular exhaust gas flowmeter 10 is shown in FIG. 2. The modular design allows easy transfer between different vehicles. A straight pipe section 11 serves as a housing for a flow straightener 8 (a plurality of parallel vanes), flow sensing element 13, pressure detector 14, a thermocouple 15, and a closed-end exhaust gas sample tube 12, all in a single assembly which is easily transferable from one vehicle to another. Straight pipe section 11 also serves to provide the requisite straight pipe runs upstream and downstream of the flow sensing element 13 as described below.

The preferred flow sensing element 13 is manufactured by Dieterich Standard of Boulder, Colorado, a subsidiary of Dover Industries, marketed under the tradename ANNUBAR DIAMOND II and is of the differential pressure type. The flow sensing element 13 includes a probe 131 mounted in the exhaust gas stream perpendicular to the axis of the straight pipe section 11. The exhaust gas flowing around the probe 131 causes a differential pressure to develop between the upstream and downstream sides of the probe 131. The magnitude of the pressure difference is indicative of the exhaust gas flow rate through the straight pipe section 11.

Flow sensing Element

Figure 3:
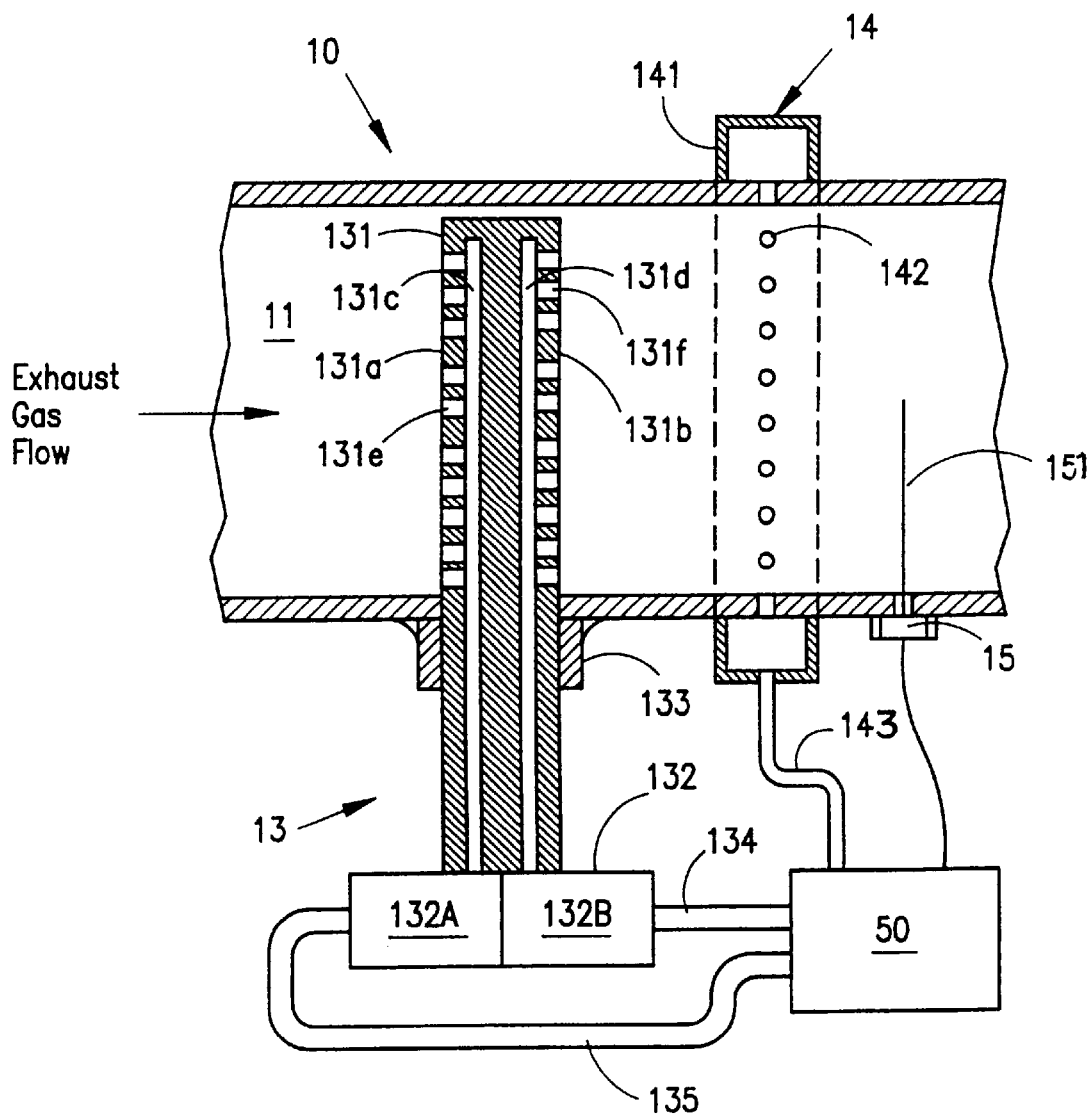
FIG. 3 is a schematic view of a portion of the modular flowmeter of FIG. 2.

As is shown in more detail in FIG. 3, the probe 131 of the ANNUBAR flow sensing element 13 has a high pressure (upstream) longitudinal channel 131c and a low pressure (downstream) longitudinal channel 131d. The probe 131 has a diamond-shaped cross-section and is oriented within straight pipe section 11 so as to present an upstream facing vertex 131a and a downstream facing vertex 131b. The upstream facing vertex 131a has a plurality of apertures 131e, spaced along its length and providing fluid communication between the exhaust gas stream and the high pressure channel 131c. Likewise, the downstream facing vertex 131b has a plurality of apertures 131f, spaced along its length and providing fluid communication between the exhaust gas and the low pressure channel 131d. The spacing of aperatures 131e and of 131f is closer at the ends of probe 131 than at its center. The channels 131c and 131d, in turn, communicate the upstream and downstream pressures to chambers 132A and 132B in the head 132 of the ANNUBAR flow sensing element 13 and from there through lines 134, 135 to a single differential pressure transducer 501 housed within electronic unit 50. The pressure transducer 501 is a PX164-010D5V, 0-10" $H_2O$ differential transducer. At 133 is shown a "Weld-O-let" which is essentially a threaded steel nipple or lug welded to pipe section 11 to threadably receive and support the probe 131. The probe is located both downstream of a straight pipe length "A" and upstream of a second straight pipe length "B", each of sufficient length to ensure straight flow at the probe location. For example, for a pipe section 11 having a diameter (O.D.) of 3½" or 5", "A" is preferably 34" minimum and "EB" is preferably 30" minimum. Pipes or tubes having an O.D. of less than 3½" would have shorter minimum dimensions "A" and "B". For example, a 2" O.D. pipe would have a minimum "A" length of 17" and a minimum "B" length of 12".

Pressure & Temperature Detection

FIG. 3 also shows the details of the pressure detector 14 as including an annular jacket 141 and a plurality of ⅟₁₆" holes 142 drilled through the wall of pipe section 11 and evenly spaced in a circle around the circumference of pipe section 11 to provide for exhaust gas fluid communication with the interior of jacket 141. The exhaust gas pressure is fed via a conduit 143 to a second pressure transducer 502 housed within electronics unit 50. Pressure transducer 502 is a PX142-015A5V with a range of 0–15 psia (Abs.).

Temperature of the exhaust gas is detected by a J-type thermocouple 15 having a probe 151 extending into the exhaust gas stream within pipe section 11. The thermocouple 15 outputs a nonlinear voltage signal which is converted within electronics unit 50 into a linear voltage signal by a TAC-386-JF converter 503. The J-type thermocouple was selected because it offers a large voltage (signal) change per degree of temperature change within the expected temperature range of the exhaust gas.

Figure 6:
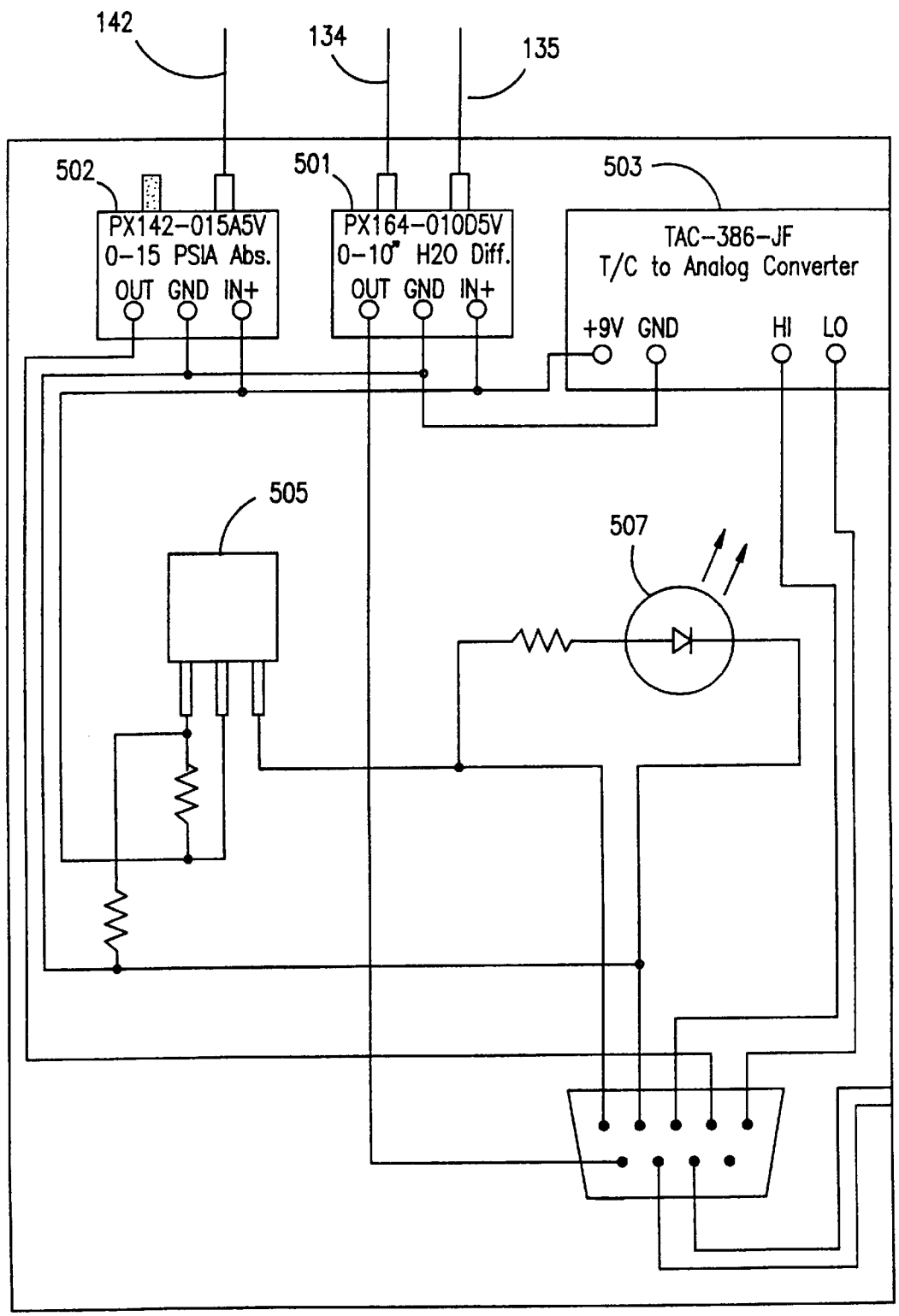
FIG. 6 is an electrical diagram of the transducer box used in both of embodiments 1 and 2.

FIG. 6 shows the electronics unit 50 as including the pressure transducer 502 (PX142-015A5V 0–15 PSIA Abs), differential pressure transducer 501 (PX164-010D5V 0–10" $H_2O$ diff.), voltage converter 503 (TAC-386-JF), voltage regulator 505 (LM317T) and LED 507 (RS276-963).

Gas Analyzer

Figure 9:
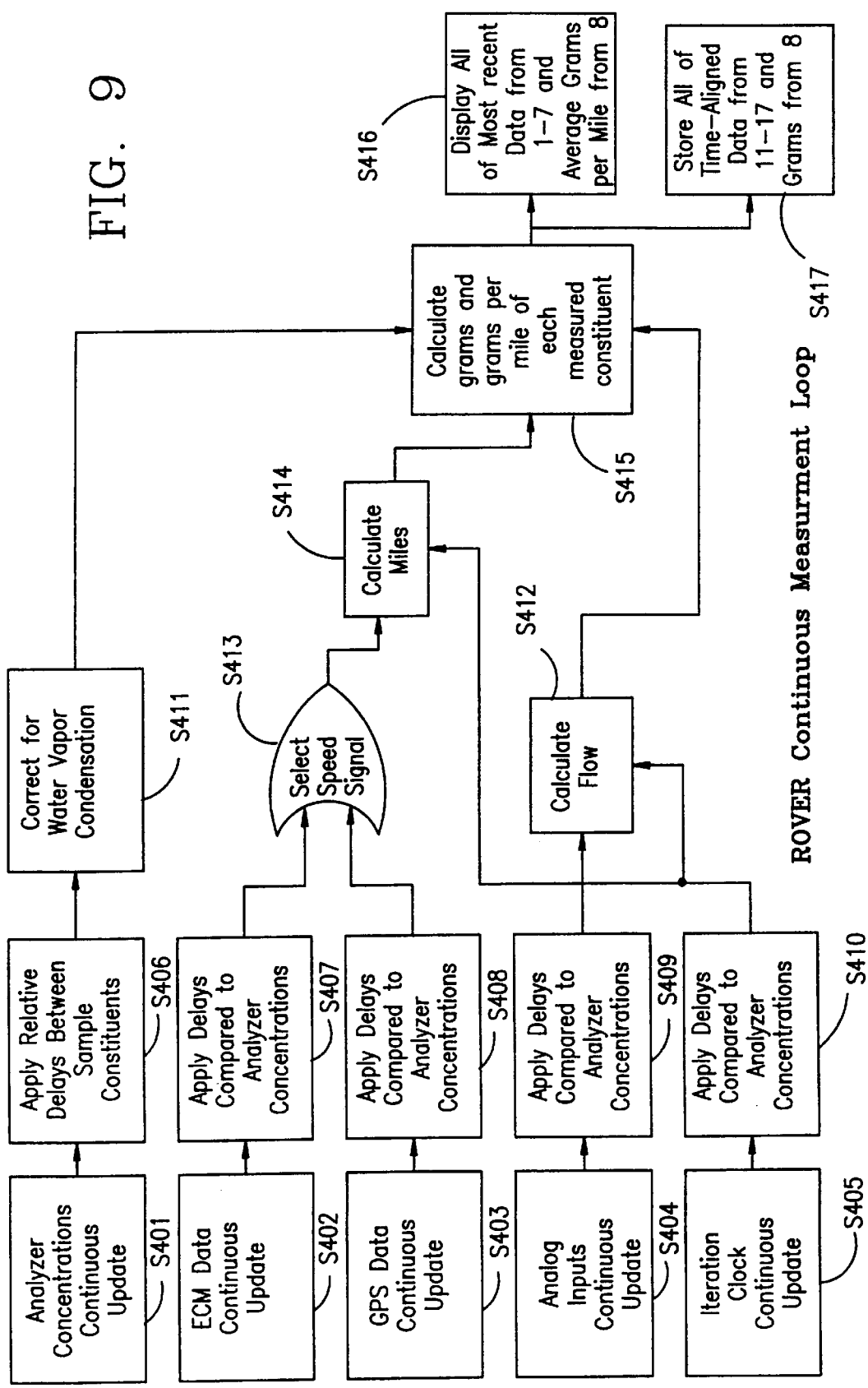
FIG. 9 is a flow chart of a subroutine for the continuous measurement loop of the operation program (step S4—FIG. 8)

The gas analyzer 30 is a model MT-3505 marketed by Sun/Snap-on. It analyzes and displays the concentrations of HC, Co, $CO_2$, $O_2$, and NO of the exhaust gas sample as well as engine RPM, temperature sensed by the analyzer thermocouple, and the air/fuel ratio calculated based on the measured exhaust gas constituents. The gas concentrations shown on the graphical user interface (GUI) (FIG. 10) will always be the same as those shown on the real analyzer display. Since there is a sample transport time delay between the appearance of the emissions sample at the sample probe and the concentration measurement by the analyzer, the analyzer virtual instrument has a user input for the time delay in seconds. The time delay is applied as shown in FIG. 9.

The concentration Xi of each of the gaseous pollutants i is continuously measured using the SUN/Snap-on MT-3505 portable emissions analyzer 30 with a built-in sample pump manufactured by SUN/Snap-On. The analyzer uses the Non-Dispersive Infrared (NDIR) method for analysis of HC (n-hexane), CO, and $CO_2$. The analyzer 30 also provides electrochemical NO analysis, and an oxygen sensor is used for determining the oxygen concentration of a gas sample.

In addition to the above-mentioned functions of the MT-3505 analyzer 30, it also calculates the air/fuel ratio of the fuel mixture to the vehicle's engine based on a carbon balance of the exhaust gas components. The MT-3505 analyzer also provides for one k-type thermocouple input. This K-type thermocouple is used for measuring the gas sample temperature upon entry to the analyzer for purposes of determining a water vapor correction factor to compensate for the water vapor condensing from the sample along the long sample hose.

The MT-3505 analyzer 30 is particularly useful as part of a larger emissions testing system since it can be configured to continuously output the measured concentrations in an RS-232 serial data stream.

Optionally, a second gas analyzer 32, identical to 30, may be utilized with its sampling probe located upstream of the catalytic converter for the purpose of providing catalyst efficiency checks.

As shown in FIG. 2 the probe 12 connected to the sample line of the gas analyzer 30 is a stainless steel tube (⅜" OD) with a sealed distal end and 6³⁄₃₂" holes drilled around its circumference, all holes being within 1" of the tip. The probe 12 enters through the wall of the steel elbow 16 and is concentric with straight tube section 11.

Scan Tool

The scan tool 70 is a Monitor 4000 Enhanced, marketed by OTC, a division of SPX Corporation. It serves as the means for determination of various vehicle and engine operating parameters including vehicle speeds, engine speed, and in some cases, engine output torque, etc.

The preferred operating program, described below, allows the user to select which ECM data stream items the user wishes to monitor with the associated OTC scan tool. As shown in FIG. 10, the checkbox associated with the desired item causes that item to be selected, displayed, recorded, and to be made available for other calculations. Each vehicle has its own associated list of selectable items. In the program described below, the "Text to Numbers" arrays substitute numerical values for boolean text values, remove units from the data to be stored to file, etc. Stripping non-numerical characters before saving the data in a file makes the data readily useable in a spreadsheet when the test is finished. A list of all the conversions and deleted characters is recorded in each data file created so the user of the data will know what the conventions were. The user also has the option of adding additional boolean text values to convert or units to remove.

Calculation of Mass Emissions

The flowmeter module 10 allows the mass emissions of each regulated pollutant to be calculated on a per second and a per mile basis. Measurement in grams/mile (gm/mi) allows direct comparison to the federal certification testing results obtained using the FTP and to the EPA Emissions standards.

The emissions of a pollutant, e.g. pollutant i at time t, can be calculated by the following formula $$P_i(t) = p_i X_i(t) Q_s(t) \cdot 60/v(t) \quad (1)$$

wherein $P_i(t)$ is the emission or pollutant i in gm/mi generated at time t, $p_i$ is the density of pollutant i at standard conditions, $X_i(t)$ is the measured concentration of pollutant i, $Q_s(t)$ is the volume flow rate of exhaust gas at standard conditions at time t(t), and v(t) is the vehicle speed on the road in mph at time t. All of the variables are time-dependent.

$Q_s$ in equation (1) is calculated in accordance with the flow equation supplied by the ANNUBAR manufacturer which can be written as $$Q_s C' \sqrt{\sqrt{h_w} \sqrt{P_f} \sqrt{T}} \quad (2)$$

where $h_w$ is the differential pressure developed across the flowmeter element, $P_f$ is the absolute pressure of the flowing gas, and T is the temperature of the gas flow in degrees Kelvin and $$C' = F_{NA} K D^2 F_{RA} Y_A F_M F_{AA} F_1 \sqrt{293} \quad (3)$$

where the factors are defined as:

$F_{NA}$—units conversion factor, a constant.

K—base flow coefficient dependent on Annubar type, a constant modified by $F_{RA}$.

D—internal diameter of pipe at base temperature, a constant modified by $F_{AA}$.

$F_{RA}$—Reynolds Number factor, a constant for the ANNUBAR DIAMOND II flow sensing element used here.

$Y_A$—expansion factor to correct for the change in density of the gas flow around the meter element as the gas velocity varies. This factor varies from 0.9955 to 1.0000 (or 0.5%) over the entire range of flow conditions expected and, accordingly, may be ignored.

$F_M$—manometer factor used with liquid-filled manometers, not applicable here.

$F_{AA}$—Thermal expansion factor to correct for flow area change of pipe at meter element due to temperature effects. For steel exhaust pipe, this factor varies between 1.000 @ 68F and 1.009 @ 675F, the maximum flow temperature expected.

$F_1$—gage location factor accounts for the effect of changes in the gravitational constant at various latitudes and altitudes. This factor varies between 0.9982 (0 latitude @ 10,00 ft) and 1.0013 (90 latitude, sea level). Thus the maximum variation between any two points on Earth is 0.3% and is therefore ignored.

Preferably, instead of calculating the flow rate as a product of all of the factors described above, the whole flowmeter module as installed may be calibrated in accordance with formula (4) as follows. Calibration in accordance with equation (4) provides better accuracy, simplifies the flow calculation under varying flow conditions and is independent of the vehicle installation. Specifically, the flow calculation simplifies to $$Q_S = C F_{AA\sqrt{+e,rad \ hw}} + ee \ \sqrt{P_f(T+273)})^{1/2} \quad (4)$$

wherein C is the constant to be determined by the flowmeter calibration below, T is the temperature of the flowing gas in degrees Celsius as detected by thermocouple 15, $P_f$ is the absolute pressure of the flowing gas as detected by pressure detector 14 and $F_{AA}$ is as given above. $h_w$ is the differential pressure from the flow element 131, as sensed by the differential pressure transducer 501 which outputs an analog voltage proportional to $h_w$. This signal is converted to digital form by the parallel port A/D converter 28, is subsequently read by the computer 40 through its parallel port, and is then scaled to physical units of pressure by the operating program described below.

As noted above, the exhaust temperature T, is sensed by the J-type thermocouple 15 mounted in the modular exhaust flowmeter 10. The thermocouple voltage is cold-junction compensated, linearized, and amplified by a thermocouple to millivolt converter. The output voltage is then input to the parallel port A/D converter 28 and is subsequently read by the computer 40 through its parallel port.

The analog input voltages read using the A/D converter 28 are all scaled by the operating program to give readouts in physical units of temperature (° F.) and pressure (inches $H_2O$ and inches Hg). The necessary scaling values are determined through calibrations of the transducers and are input to the operating program through the GUI as shown on the "Analog Diff. Inputs" section shown in FIG. 10.

Flowmeter Calibration

Each flowmeter module is individually calibrated using air by placing it in series with a known flowmeter standard and a vacuum source, such as a blower. The flowmeter module electrical connections are made as in a normal test installation so the flow sensor differential pressure and gas absolute pressure and temperature are input to the computer. Simultaneously, and under control of calibration software developed for this purpose the pressure values and temperature needed for determining the flow of the flow standard are all simultaneously read by the system computer. The calibration software determines the flow through the flow standard for each flow rate selected by adjustment of a butterfly valve. The constant C' in Equation 2 can then be determined for each flow setting within the range of flows expected for the given flowmeter module. An average of the individual values throughout the expected flow range is used. C' values only differ by very small amounts through the expected range. The resultant C' calibration value is unique to the calibrated flowmeter an item of data input to the operating program whenever the associated flowmeter is used for subsequent emissions testing.

Most light-duty vehicles' engine control systems now have the ability to continuously output a serial data stream containing numerous engine and vehicle operating parameters such as throttle position, coolant temperature, vehicle speed, etc. The format of streams is proprietary. The OTC Monitor 4000 Enhanced scan tool has the ability to input such a proprietary data stream, interpret it, and output a secondary RS232 serial data stream containing the vehicle operating parameters in ASCII code.

The present invention takes advantage of the capabilities of the Monitor 4000 Enhanced scan tool 70 by interfacing with the scan tool RS232 port with the computer, allowing remote setup and access of the scan tool 70 data stream.

For vehicles which have such a data stream available, the system can be configured to monitor the vehicle's speed v, and use this speed as a basis for determining the incremental distance travelled $\Delta d_j$, by the vehicle over each successive sampling interval $\Delta t_j$. The incremental distance can be expressed as $$\Delta d_j = v \Delta t_j$$

For those vehicles which do not have an accessible data stream, the speed v can be obtained from the data stream of the PATHFINDER™ Trimble Global Position Receiver 60.

Heavy duty vehicles typically include engine torque in their accessible stream. By multiplying engine torque by engine speed and by time a value for power can be obtained. Accordingly, a mass emission rate for such heavy duty vehicles can be expressed as grams per brake-horsepower-hour.

Air/Fuel Ratiometer

As mentioned above, the air/fuel ratio is continuously calculated by the MT3505 emissions analyzer 30 based on a carbon balance of the gaseous emissions concentrations. Alternatively, the air/fuel ratio may be provided by a separate air/fuel NGK ratiometer 26, employing a lambda sensor. The installation of the lambda sensor in the exhaust system should be as close to the exhaust manifold as possible, to maintain the temperature of the sensor above its operating threshold. The analog voltage output of the NTK air/fuel ratiometer 26, or any other device with a common analog output, can be connected to the A/D hardware for conversion to digital data read by the computer through its parallel port. This data is then displayed in real time.

GPS Receiver (Optional)

The Global Positioning System (GPS) magnetic mount antenna 60 is marketed by Trimble Navigation and is used in connection with a Trimble PATHFINDER™ GPS PC card 115 and Trimble GPS software which allows the operating program described below (ROVER™ software) to communicate with it, when selected by the user.

PM Detector (optional)

FIG. 4 shows another embodiment of the present invention, similar to the first described embodiment but designed for a diesel powered vehicle with addition of a particulate matter (PM) detector 80. A raw exhaust gas sample is drawing through an open-ended and heated sample probe 801 using a vacuum pump 811. The raw sample is diluted in a mixer 806 with a precisely metered, variable quantity of filtered air using a mass flow controller 802 before passing through one of two filter banks, each consisting of 2 filters 803, 804 in series. Air for dilution is fed to mass flow controller 802 by a dilution air pump 816. The diluted sample mass flow is held constant using a second mass flow controller 805. The quantity of dilution air is varied in real-time to keep the raw sample mass flow rate proportional to the total exhaust gas mass flow rate to ensure a proportionate sample. Alternatively, the diluted mass flow can be controlled by mass flow controller 805 to be proportionate to the total exhaust gas mass flow rate while maintaining proportionality of dilution air by mass flow controller 802. The particulate matter remains on the filter in the same way as in the federal procedure. The mass increase of the filters 803, 804 at the end of the testing, compared with their initial mass, allows one to determine the particulate mass emissions of the vehicle/engine being tested. The raw sample and the dilute sample temperatures are monitored and if either falls below a threshold level the raw sample is heated via the sample probe heater element (see Nichrome Wire 813 in FIG. 5) under control of temperature controller 817. Typically, this would be done during testing of a "cold" engine or any time it is determined that condensation may form in the sampling system. The absolute pressure and the pressure drop across the filter bank are also monitored. The dilute sample flow rate is chosen so that a complete test (depending on what the operator has in mind) can be completed before the pressure drop exceeds a threshold value. This is to ensure that the filtered sample is not in a low pressure or high velocity environment which would cause loss of the volatile component of the PM sample. Equivalence with the federal procedure is extremely important, since the federal procedure is the tool used to determine compliance with federal regulations. The pressure drop across the filters is also recorded second by second in the computer data file. This allows one to not only know the PM mass emissions during the selected test, but also to post-process the data and determine at which time, and under what engine or vehicle operating conditions (by using the vehicle's on-board sensed parameter values as described above), the PM emissions were emitted. This helps one in determining the cause of the high PM emissions in a manner similar to that described above for gaseous emissions.

A solid state relay 810 controls a 3-way valve which allows switching of the gas sample flow from probe 801 between (1) a first bank of filters 803 and 804 and (2) a second bank of filters 803 and 804. The second bank of filters can also serve as a by-pass for desired pauses in sampling.

As seen in FIG. 5 probe 801 includes a sample probe insulated from the nichrome wires 813 embedded in ceramic 814 for heating the probe 812 and an other layer of insulation 815 to reduce heat transfer to the exhaust gases surrounding the probe.

The embodiment of FIG. 4 further includes the other system components shown in FIG. 1.

Smoke Meter (Optional)

An optical opacity meter 900 (FIG. 4) can also be used in conjunction with the system. The smoke meter head 900 optically senses the exhaust gas opacity and transmits analog voltage signals to the A/D converter 16 for transmission to computer 40. A Telonic Berkeley Model 300 instrument is preferably used as the smoke meter or optical density meter 900.

Operating Program

Figure 8:
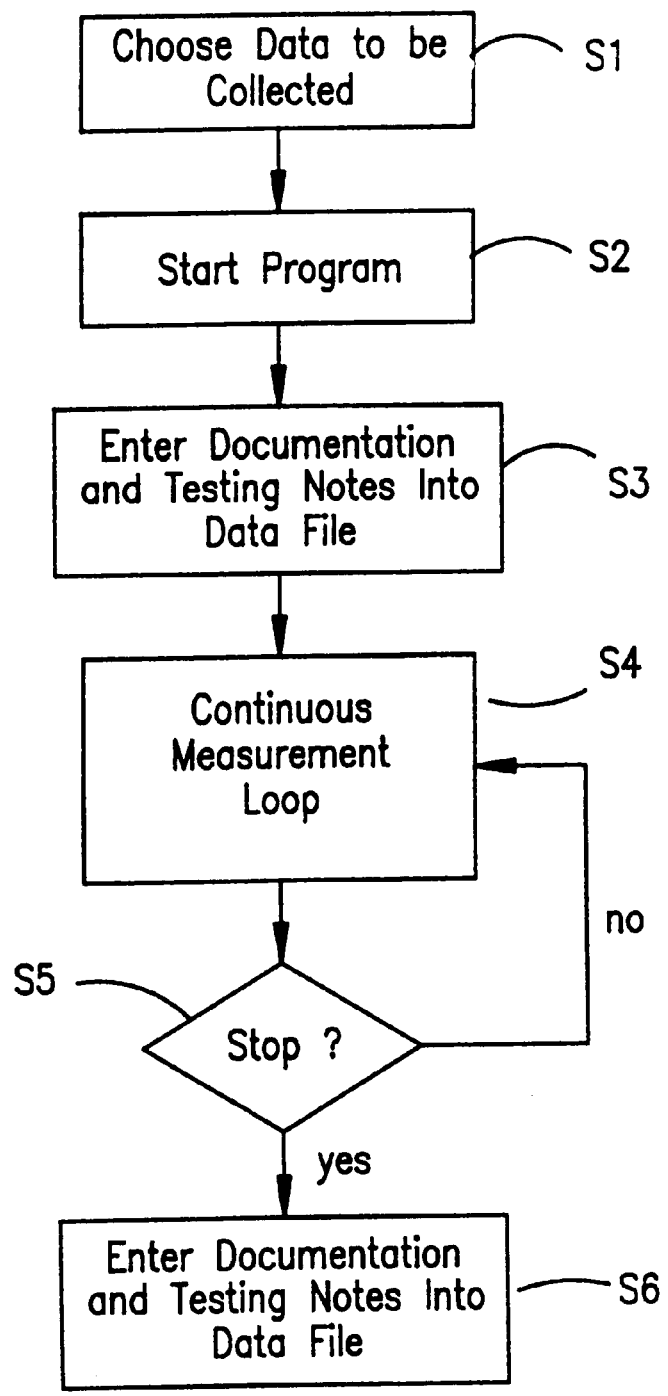
FIG. 8 is a flow chart of the preferred main operating program for the emissions reporting system of the present invention.

A preferred embodiment of a program for operation of the system of the present invention is illustrated by the flow chart shown in FIGS. 8 and 9.

The flow chart of FIG. 8 illustrates the preferred main operating program (ROVER™ software) for operation of the emissions reporting system after installation on the vehicle to the tested. The operator designates which data is to be collected by means of the available selections of the graphical user interface shown in FIG. 10 (step S1). Then, immediately upon starting the program (step S2), a documentation window opens allowing the technician to enter notes concerning the vehicle and test to be performed (step S3). The notes are input using the computer keyboard 41. Upon completion of the pre-test documentation, the documentation window closes and the program continuously acquires the desired data and performs the necessary calculations (step S4) and displays the emissions and vehicle data on the computer screen and in a stored computer file. The program continues in this mode of operation (loop of S4) until stopped by the operator. Once the operator chooses to stop to the program (step S5), the user documentation window reopens on the computer screen to allow entry of post-test documentation and notes concerning the vehicle and test just conducted (step S6).

FIG. 9 illustrates the subroutine for the "Continuous Measurement Loop (S4) of FIG. 8. During each iteration and at a set frequency, typically 1 Hz, raw data is collected from each of the sources S401–S405 as shown. Since there are small, known characteristic time delays associated with each of the sources, time-based adjustments are applied as shown (S406–S410). Additionally, the gas concentrations measured by the analyzer are corrected for water vapor condensation which takes place along the sample hose en route to the analyzer (S411). Exhaust gas flow at standard conditions is determined according to Equation 4 using the analog input voltages scaled to the appropriate physical units (S412). From the corrected gas concentrations and exhaust gas flow, mass calculations are then performed with only the additional parameter of the known gas densities (S415). And with the addition of the speed signal (S413) and iteration time (S414), grams per mile are determined for the iteration (S415). The data is then Displayed on the computer screen (S416) and saved to a computer data file (S417).

Exhaust Gas Connection and Module Support

Figure 7:
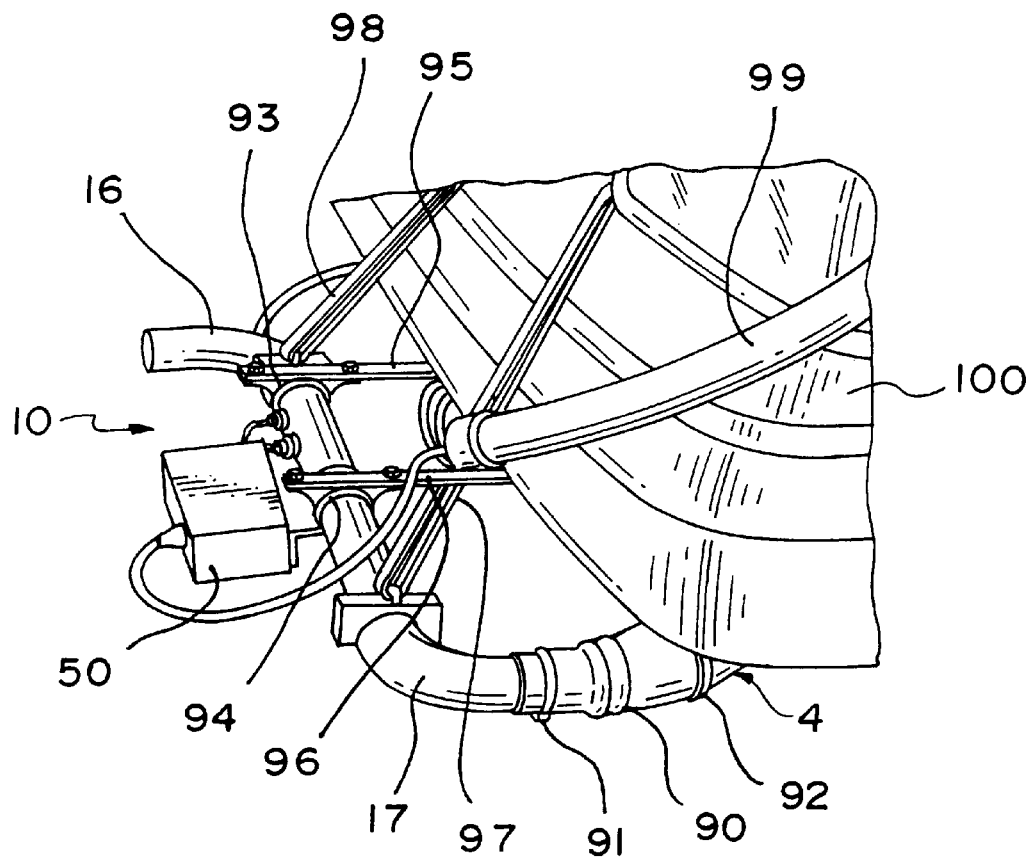
FIG. 7 shows the modular flowmeter of FIG. 2 mounted on a passenger vehicle.

FIG. 7 shows the flowmeter/gas sampling probe module 10 mounted on the rear of a passenger vehicle 100. An example of the connection means for connecting the module 10 of the present invention to the exhaust pipe 4 of vehicle 100 is shown as the elastomeric boot 90 which is connected to the upstream end of elbow 17 of module 10 and to the exhaust pipe 101 by hose clamps 91 and 92. The elastomeric boot may be a high-temperature resistant silicone rubber tube of the type used to connect a vehicle exhaust pipe to a conventional (stationary) test stand used in emissions testing. An insulated conduit 99 carries the sample tube from the module 10 to the gas analyzer 30 and leads from the pressure transducers 501, 502, thermocouple 15, etc. to the A/D converter 28 and then to computer 40.

The means for supporting the module of the present invention is seen in FIG. 7 as a pair of pipe hangers 93, 94 which, in turn, are supported by rods 95, 96 connected to the chassis of vehicle 100. Rubber straps 97, 98 serve to provide further support for the module 10. Other means may be used to secure the flowmeter modules consistent with safety.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A real-time, on-road vehicle emission reporting system comprising:

means, mounted for travel with a vehicle and operative during actual road travel, for determining flow rate of exhaust gas from an engine powering the vehicle;

a gas analyzer for detecting concentration of each of a plurality of gaseous pollutants within the exhaust gas; and calculating means for calculating and reporting mass flow rates for the gaseous pollutants in real-time based on the detected concentrations.

2. A mobile vehicle on-board testing system according to claim 1 wherein mass flow rates are each calculated as a unit mass of gaseous pollutant per unit distance travelled and further comprising distance detecting means for continuously detecting distance travelled by the vehicle.

3. A mobile vehicle on-board testing system according to claim 2 wherein said distance detecting means is a scan tool which receives data from an engine computer on-board the vehicle and which transmits the received data to said calculating means.

4. A mobile vehicle on-board testing system according to claim 3 wherein said calculating means, based on the data received from the scan tool, correlates the calculated mass flow rates with at least one engine operating parameter.

5. A vehicle emissions reporting system according to claim 1 wherein said means for determining the flow rate of the exhaust gas is a flowmeter which directly measures an actual exhaust gas flow rate.

6. A mobile vehicle on-board emissions testing system, said system comprising:

a module for detachably mounting on, a vehicle to be tested and containing a flow sensing element;

support means for attaching said module to a body portion of the vehicle;

connection means for detachably connecting said module to an exhaust pipe of the vehicle, whereby flow rate of exhaust gas of the vehicle is detected by said flow sensing element;

a downstream sampling tube for continuously sampling the exhaust gas of the vehicle;

a downstream gas analyzer for detecting concentration of each of a plurality of gaseous pollutants within the exhaust gas sampled through said downstream sample tube; and calculating means for calculating mass flow rates for each of said gaseous pollutants based on the detected concentrations and the detected flow rate of the exhaust gas.

7. A mobile vehicle on-board emissions testing system according to claim 6 wherein said connection means comprises an elastomeric boot.

8. A mobile vehicle on-board emissions testing system according to claim 6 wherein said sampling tube is fixed within said module.

9. A mobile vehicle on-board emissions testing system according to claim 6 further comprising:

an upstream sampling tube for continuously sampling the exhaust gas of the vehicle upstream of a catalytic converter, said downstream sampling tube being located downstream of the catalytic converter; and an upstream gas analyzer for detecting concentrations of each of said plurality of gaseous pollutants, said calculating means determining an efficiency for the catalytic converter by comparing the concentrations detected by said upstream gas analyzer with the concentrations detected by said downstream gas analyzer.

10. A mobile vehicle on-board emissions testing system according to claim 6 additionally comprising:

an open-ended gas sampling tube, mounted within said module, for continuously sampling the exhaust gas inclusive of particulates; and at least one removably mounted filter element whereby said one filter element may be weighed before and after a known period of time during which exhaust gas from said open-ended sampling tube is passed through said one filter element.

11. A mobile vehicle on-board emissions testing system according to claim 6 wherein mass flow rates are each calculated as a unit mass of gaseous pollutant per unit distance travelled and further comprising distance detecting means for continuously detecting distance travelled by the vehicle.

12. A mobile vehicle on-board emissions testing system according to claim 11 wherein s aid distance detecting means is a scan tool which receives data from an engine computer on-board the vehicle and which transmits the received data to said calculating means.

13. A mobile vehicle on-board emissions testing system according to claim 12 wherein said calculating means, based on the data received from the scan tool, correlates the calculated mass flow rates with at least one engine operating parameter.

14. A mobile vehicle on-board emissions testing system according to claim 6 additionally comprising:

a global positioning system receiver for continuously receiving signals for use in calculating present position of the vehicle; and wherein said calculating means repeatedly computes present position of the vehicle based on the signals from said receiver and correlates the computed present positions with the calculated mass flow rates of said pollutants.

15. A mobile vehicle on-board emissions testing system according to claim 6 wherein said calculating means also calculates fuel economy in real time.

16. A mobile vehicle on-board emissions testing system according to claim 6 further comprising support means for attaching and fixing said module to a body portion of the vehicle.

17. A mobile vehicle on-board emissions testing system according to claim 6, wherein said module comprises:

a module housing including straight pipe section having an open interior;

a flow sensing element mounted within said straight pipe section for determining the velocity of the exhaust gas flow through the open interior of said straight pipe section; and a gas sampling tube extending into said open interior at a position fixed relative to said flow sensing element for obtaining a sample of the exhaust gas and for feeding the sample to the downstream gas analyzer.

18. A mobile vehicle on-board emissions testing system according to claim 17 wherein said module further comprises:

a pressure detector for detecting pressure of the exhaust gas flow adjacent said flow sensing element;

a temperature probe for detecting temperature of the exhaust gas flow adjacent said flow sensing element; and a plurality of parallel vanes mounted within said open interior upstream of said flow sensing element for straightening the exhaust gas flow.

19. A mobile vehicle on-board emissions testing system according to claim 18 wherein said pressure detector comprises an annular jacket sealed around the exterior of said straight pipe section and a plurality of spaced holes extending through said straight pipe section and arranged in a circle around a circumference of said straight pipe section, said plurality of holes providing fluid communication between said open interior and said annular jacket and a pressure detector, in fluid communication with said annular jacket.

* * * * *